United States Patent Office 3,318,843
Patented May 9, 1967

3,318,843
PROCESS FOR MAKING EQUILIBRATION OF ORGANOPOLYSILOXANES USING PHOSPHOROUS-CONTAINING CATALYSTS
Ben A. Bluestein, Schenectady, N.Y., assignor to General Electric Company, a corporation of New York
No Drawing. Filed Dec. 24, 1962, Ser. No. 246,668
5 Claims. (Cl. 260—46.5)

The present invention relates to novel organopolysiloxane compositions convertible to the cured, solid, elastic state. More particularly, the present invention relates to a method for equilibrating carbalkoxyalkylsiloxy units and other organosiloxy units by use of certain phosphorus-containing catalysts to provide for the production of novel carbalkoxyalkylpolysiloxane polymers, and to novel organopolysiloxane compositions derived therefrom.

The carbalkoxyalkylpolysiloxane polymers made in accordance with the present invention have the formula:

(1) $(ROOCR')_a(R'')_b(R''')_c SiO_{\frac{4-(a+b+c)}{2}}$ where R is a member selected from monovalent hydrocarbon radicals, halogenated monovalent hydrocarbon radicals and monovalent alkoxyalkyl radicals, R' is an alkylene radical, R'' is a member selected from monovalent hydrocarbon radicals and halogenated monovalent hydrocarbon radicals, and R''' is a member selected from monovalent hydrocarbon radicals, halogenated monovalent hydrocarbon radicals and cyanoalkyl radicals, $a$ is equal to from .001 to 1, inclusive, $b$ is equal to from 0 to 2, inclusive, $c$ is equal to from 0 to 2.5, inclusive, and the sum of $a$, $b$ and $c$ is equal to from 1.5 to 3, inclusive.

Prior to the present invention, one of the methods employed to make organopolysiloxane polymers which had attached to silicon atoms, by carbon-silicon linkages, carbalkoxyalkyl radicals of the formula:

(2) ROOCR'— where R and R' are as defined above, is shown in Bluestein Patent 3,065,202 assigned to the same assignee as the present invention. The Bluestein method involves reacting a cyanoalkylchlorosilane and an alcohol and thereafter reacting the alkoxylated product with water. Although polymers having radicals of Formula 2 attached to silicon atoms can be made by the aforementioned Bluestein method, in a direct and convenient manner, this method does not provide for the advantages achieved by catalytic equilibration involving the rearrangement and intercondensation of siloxy units. Another method for making organopolysiloxane polymers having attached to silicon atoms the radicals of Formula 2 is by directly esterifying the corresponding organopolysiloxane polymer having carboxyalkyl radicals attached to silicon atoms by silicon-carbon linkages. These carboxyalkyl-containing polysiloxane polymers can be made by the method shown in French Patent 1,158,808 and Bluestein Patent 3,047,528, assigned to the same assignee as the present invention. Although these prior art methods provide for the production of a variety of useful organopolysiloxane polymers having the radicals of Formula 2 attached to silicon atoms, the products so produced are not equivalent to the products produced by the direct equilibration of carbalkoxyalkyl siloxy units and other organo siloxy units. The advantages achieved in making various organopolysiloxane polymers by catalytic equilibration, include, for example, a means for obtaining a wide range of linear polymers as described in Rochow, Chemistry of the Silicones (2nd edition), John Wiley and Sons, New York. Organopolysiloxane products produced by simple hydrolysis, however, as utilized in the aforesaid Bluestein method, result in the production of a high proportion of cyclics and low molecular weight materials. Attempts to equilibrate these hydrolysis products with other organo siloxy units to provide for the production of a wide variety of linear high molecular weight polymers composed of chemically combined carbalkoxyalkyl siloxy units, and other organosiloxy units, as provided by catalytic equilibration were unsuccessful because the conventional equilibration catalysts such as potassium hydroxide, sulfuric acid, etc. were found to be ineffective. In addition, even though organopolysiloxane polymers having carboxyalkyl radicals can be produced by catalytic equilibration as taught in the above Bluestein Patent 3,047,528, the direct esterification of such polymers with an alcohol to make organopolysiloxane polymers having radicals of Formula 2 becomes increasingly difficult as the molecular weight of the carboxyalkyl polymer increases. It would be desirable therefore, to be able to directly equilibrate carbalkoxyalkylsiloxy units and other organosiloxy units to provide for the rearrangement and intercondensation of the respective units and the production of a variety of useful carbalkoxyalkylpolysiloxane polymers.

The present invention is based upon the discovery that the equilibration catalyst shown in copending application Ser. No. 246,667, filed Dec. 24, 1962, which is produced by the reaction between water and certain phosphorous halogen compounds such as phosphorous pentahalides or phosphorous oxy halides, can be used to equilibrate carbalkoxyalkylsiloxy units and other organosiloxy units. As a result of this discovery there is provided a method for making a variety of linear carbalkoxyalkyl polysiloxane polymers included by Formula 1.

In accordance with the practice of the invention, there is provided a method for making the carbalkoxyalkylpolysiloxane polymers of Formula 1, by the equilibration of an organopolysiloxane composed of from 0% to 99.9% by weight of organosiloxane hydrolyzate having chemically combined organosiloxy units included by the formula:

(3) $(R''')_d SiO_{\frac{(4-d)}{2}}$ and from 0.1% to 100% by weight of carbalkoxyalkylsiloxane hydrolyzate having chemically combined carbalkoxysiloxy units included by the formula:

(4) $ROOR'Si\underset{\frac{3-e}{2}}{\overset{(R'')_e}{|}}$ which process comprises (1) forming a mixture composed of by weight (A) 100 parts of said organopolysiloxane and (B) 0.01 to 10 parts of an equilibration catalyst formed by reacting at a temperature in the range between −10° C. to 100° C., water, and 0.3 to 10 moles, per mole of water of a member selected from a phosphorous pentahalide and a phosphorous oxygen trihalide, and (2) heating said mixture of (1) to effect the equilibration of (A), where R, R', R'' and R''', $a$, $b$ and $c$ are as defined above and $d$ is an integer equal to from 1 to 3, inclusive, and $e$ is an integer equal to from 0 to 2, inclusive.

Included by the polymers of Formula 1, are elastomeric forming copolymers having a viscosity greater than 100,000 centipoises at 25° C. These copolymers can be made in accordance with the practice of the invention as described above from organopolysiloxane composed of by weight of from 80 to 99.9 percent of organosiloxane hydrolyzate as shown in Formula 3, and from 20 to 0.1 percent of carbalkoxyalkyl siloxane hydrolyzate shown in Formula 4 where $a$ in Formula 1 is equal to from 0.001 to 0.1, inclusive, $b$ is equal to from 0 to 0.2, inclusive, $c$ is equal to from 1.6 to 2.009, inclusive, and the sum of $a$, $b$ and $c$ is equal to 1.9 to 2.01, inclusive.

Novel organopolysiloxane compositions convertible to the cured, solid, elastic state also are included by the present invention which comprise (A) 100 parts of the above described elastomeric forming copolymers, (B) 10 to 300 parts of a filler, (C) 0 to 10 parts of a polyol, and (D) a curing catalyst selected from (1), 1 to 8 parts of an organic peroxide, (2) 1 to 40 parts of a polyvalent metal compound, and (3) more than about 1 part of about 48 parts of a mixture of (1) and (2).

Radicals included by R of Formula 1 are aryl radicals, such as benzyl, phenyl ethyl; alkyl radicals such as methyl, ethyl, propyl, isopropyl, butyl, hexyl; chloroalkyl radicals such as fluoromethyl, fluoroethyl; alkoxyalkyl radicals such as ethoxyethyl, ethoxybutyl, etc. Radicals included by R' of Formula 1 are polymethylene radicals such as ethylene, trimethylene, tetramethylene, pentamethylene, octamethylene, etc. Radicals included by R'' of Formula 1 are for example, aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic such as alkyl, alkenyl, cycloalkyl, haloalkyl, including methyl, ethyl, propyl, chlorobutyl, cyclohexyl, etc. Radicals included by R''' are all the aforementioned R'' radicals and cyanoalkyl radicals such as cyanoethyl, cyanopropyl, cyanobutyl, etc. R, R', R'' and R''' can be all the same radical respectively, or any two or more of the aforementioned R, R', R'', R''' radicals. R is preferably methyl, R' is preferably ethylene, and R'', and R''' are preferably methyl.

Phosphorous halogen compounds which can be employed in the practice of the invention to form the equilibration catalyst for the equilibration of units of Formulae 3 and 4, are phosphorous pentahalide, such as phosphorous pentachloride, and phosphorous pentabromide, and phosphorous oxygen halides such as phosphorous oxytrichloride and phosphorous oxytribromide.

In addition to the above-described elastomeric forming copolymers, the polymers of Formula 1 include a variety of polymeric and copolymeric products such as fluids and gums having viscosities ranging from 10 centipoises or less to as high as $10^8$ centipoises or more. For example, fluid copolymers can be made by the method of the present invention having up to about $10^5$ centipoises at 25° C. while gums can vary between $10^5$ to $10^8$ or higher.

The organosiloxane hydrolyzate shown in Formula 3, can be composed of up to 100% by weight of a cyclopolydiorganosiloxane having the formula:

where R''' is as defined above, and $n$ is an integer equal to from 3 to 10, inclusive. The organosiloxane hydrolyzate of Formula 3 can be obtained by hydrolyzing chlorosilanes included by the formula:

(6) $\quad (R''')_d Si(X)_{4-d}$ where R''', and $d$ are as defined above, and X is a halogen radical such as chloro or bromo. The cyclic polysiloxanes of Formula 5 are well known in the art and can be produced by methods described in Rochow, Chemistry of the Silicones, as described above. Cyclic polysiloxanes included by Formula 5 are for example hexamethylcyclotrisiloxane, octamethylcyclotetrasiloxane, decamethylcyclopentasiloxane, etc. The formation of the organosiloxane hydrolyzate of Formula 3 from the organochlorosilanes of Formula 6 can be achieved in accordance with conventional hydrolysis and cohydrolysis procedures, also described by Rochow. Examples of organochlorosilanes included by Formula 6 are methyltrichlorosilane, dimethyldichlorosilane, trimethylchlorosilane, phenyltrichlorosilane, methylphenyldichlorosilane, phenyldimethylchlorosilane, etc.

One form of the carbalkoxyalkylsiloxane hydrolyzate shown in Formula 4 can be produced by the aforedescribed method of Bluestein Patent 3,065,202, by the reaction of cyanoalkylchlorosilanes having the formula:

(7) 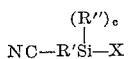

with an alcohol having the formula:

(8) $\quad$ ROH and thereafter reacting the resulting alkoxylated product with water, where R, R', R'', X and $c$ are as defined above. A preferred form of the aforementioned carbalkoxyalkylsiloxane hydrolyzate is in the form of a cyclic, having the formula:

(9) 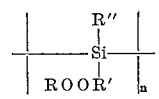

which can be made in accordance with conventional procedures by heating the hydrolyzate of Formula 4 in the presence of a minor amount of a base catalyst such as potassium hydroxide at temperatures in the range of from 200° C. to 400° C., where the various terms in Formula 9 have the same meaning as above.

The equilibration catalyst utilized in the practice of the invention is preferably made in the form of a "premix" by a batch procedure by forming a mixture of water and a phosphorous halogen compound, as previously defined, and effecting reaction between the respective components. In particular situations, it has been found expedient to add the water to the phosphorous halogen compound, although the order of addition of either component used in forming the pre-mix is not critical.

If the equilibration catalyst is formed at temperatures in which the components react exothermically upon contact, such as at room temperatures (a temperature of about 25° C.), small increments of water, such as drops, can be added to the phosphorous halogen compound at a desirable rate. Another procedure that can be employed is to mix the phosphorous halogen compound and ice at temperatures below 0° C. and allow the components to warm gradually to effect reaction.

After the components of the equilibration catalyst have reacted, a preferred procedure is to heat the catalyst to a temperature between 25° C. to 80° C., for periods of 0.1 to 48 hours. However, desirable results can be obtained if the catalyst is utilized directly without any postheating period, or preferably allowing it to stand at room temperature for a period of at least 24 hours before being used, if external heating is not employed.

After the catalyst has been formed, it can be stored for an extended period of time such as 1 to 2 weeks at a temperature of below 0° C. to 25° C.

In forming the carbalkoxyalkylpolysiloxane polymer of Formula 1, organopolysiloxane in the form of carbalkoxyalkylsiloxane hydrolyzate of Formula 4, or a mixture of such hydrolyzate with organosiloxane hydrolyzate of Formula 3 is equilibrated by use of the equilibration catalyst of the present invention. In particular situations, the use of an organic solvent can be employed if desired to facilitate the equilibration of the organopolysiloxane. Suitable organic solvents include any substantially inert organic solvent that does not interfere with the reactants during the equilibration reaction. For example, hydrocarbon solvents such as benzene, xylene, toluene, and solvents such as acetonitrile, diethyl ether, etc. can be employed.

The equilibration of the organopolysiloxane can be achieved in accordance with standard equilibration procedures, such as at temperatures in the range of from 20° C. to 160° C. The equilibration times can vary widely depending upon the nature of the organopolysiloxane,

TABLE II.—5% CARBALKOXY

| Curing Catalyst per 100 parts of Copolymer | | (B₂O₂) (Parts) | Polyol (Parts) | Cure | | | | | | | | |
|---|---|---|---|---|---|---|---|---|---|---|---|---|
| | | | | 150° C./16 Hr. | | | 200° C./16 Hr. | | | 250° C./16 Hr. | | |
| PVMC (Parts) | | | | H | T | E | H | T | E | H | T | E |
| ZnO | (0.9) | 1.7 | | 60 | 900 | 22 | | | | 71 | 670 | 120 |
| Zn(OH)₂ | (9) | | Glycerol (1.8) | 67 | 400 | 190 | | | | 86 | 430 | 30 |
| ZnO | (7.2) | 0.4 | do | 61 | 310 | 230 | 66 | 580 | 290 | 80 | 240 | 10 |
| MgO | (3.6) | 1.7 | do | 62 | 740 | 210 | 68 | 760 | 170 | 91 | 720 | 40 |
| ZnO | (7.2) | 0.4 | do | 50 | 140 | 150 | 55 | 760 | 350 | 65 | 680 | 210 |
| Iron Oxide | (1.4) | | | | | | | | | | | |
| CuO | (7.2) | 0.4 | do | 50 | 660 | 260 | 57 | 430 | 170 | 56 | 740 | 320 |

TABLE III.—1% CARBALKOXY

| Curing Catalyst per 100 parts of Copolymer | | (B₂O₂) (Parts) | Polyol (Parts) | Cure | | | | | | | | |
|---|---|---|---|---|---|---|---|---|---|---|---|---|
| | | | | 150° C./16 Hr. | | | 200° C./16 Hr. | | | 250° C./16 Hr. | | |
| PVMC (Parts) | | | | H | T | E | H | T | E | H | T | E |
| Iron Oxide | (7.2) | 1.7 | Glycerol (1.8) | 52 | 600 | 220 | 55 | 520 | 180 | 68 | 430 | 70 |
| | | 0.4 | | 39 | | 110 | 47 | 230 | 180 | 51 | 530 | 410 | into the copolymer the same amount of filler, 7.2 parts of red iron oxide, 1.8 parts of glycerol and 0.4 part of benzoyl peroxide.

The respective compositions were then cured at 150° C. for 16 hours and 200° C. for 16 hours followed by an extended post-cure of 250° C. for 16 hours. The physical properties are shown in Table III.

Based on the results shown in Table I, those skilled in the art would know that the process of the present invention provides for a unique and advantageous method for equilibrating organosiloxy units shown in Formula 3 and carbalkoxyalkylsiloxy units shown in Formula 4. In addition, that the resulting polymers made thereby could not be produced by the method shown in Bluestein Patent 3,065,202, or by the direct esterification of carboxyalkylpolysiloxane copolymers taught in Bluestein Patent 3,047,528. Since the method of the present invention provides the only way for truly equilibrating the units of Formulae 3 and 4, the carbalkoxyalkylpolysiloxane polymers of Formula 1 are unique and novel materials. Also, the organopolysiloxane compositions that are produced from the novel elastomeric forming copolymers included by Formula 1, are also novel.

While the foregoing examples have of necessity been limited to only a few of the many variables within the scope of the present invention, it should be understood that the present invention covers a much broader class of polymers included by Formula 1 and organopolysiloxane compositions containing the elastomeric forming copolymers included by Formula 1, and the aforementioned polyvalent metal compounds, polyoys, and organic peroxides previously described. In addition, the polymers of Formula 1 include a wide variety of fluids, gums, and other organopolysiloxane products. All of these various materials are prepared by methods specifically illustrated in the examples above, and described further in the foregoing description of the present invention.

What I claim as new and desire to secure by Letters Patent of the United States is:

1. A process for making carbalkoxyalkylpolysiloxane copolymers having a viscosity of greater than 100,000 centipoises at 25° C. of the formula:

$$(ROOCR')_a(R'')_b(R''')_c SiO_{\frac{4-(a+b+c)}{2}}$$

by the equilibration of an organopolysiloxane composed of from 0 to 99.9% by weight of organosiloxane hydrolyzate having organosiloxy units included by the formula, $$(R''')_d SiO_{\frac{(4-d)}{2}}$$

and from 0.1% to 100% by weight of carbalkoxyalkylsiloxane hydrolyzate having carbalkoxysiloxy units included by the formula, $$ROOCR'Si_{\frac{3-e}{2}}^{(R'')_e}$$

which process comprises (1) forming a mixture composed of by weight (A) 100 parts of said organopolysiloxane and (B) 0.1 to 10 parts of an equilibration catalyst formed by reacting at a temperature in the range between −10° C. to 100° C. water, and 0.3 to 10 moles, per mole of water of a member selected from the class consisting of phosphorous pentachloride and a phosphorous oxygen chloride, and (2) heating said mixture of (1) to effect the equilibration of (A), where R is a member selected from the class consisting of monovalent hydrocarbon radicals, halogenated monovalent hydrocarbon radicals, and monovalent alkoxyalkyl radicals, R' is an alkylene radical, R'' is a member selected from the class consisting of monovalent hydrocarbon radicals and halogenated monovalent hydrocarbon radicals and R''' is a member selected from the class consisting of monovalent hydrocarbon radicals, halogenated monovalent hydrocarbon radicals and cyanoalkyl radicals, $a$ is equal to from .001 to 1, inclusive, $b$ is equal to from 0 to 2, inclusive, $c$ is equal to from 0 to 2.5, inclusive, $d$ is an integer equal to from 1 to 3, inclusive, and $e$ is an integer equal to from 0 to 2, inclusive, and the sum of $a$, $b$ and $c$ is equal to from 1.5 to 3, inclusive.

2. The method of claim 1 where the equilibration catalyst is formed by reacting phosphorous-oxychloride and water.

3. A process for making a carbalkoxyalkylpolysiloxane copolymer having a viscosity of greater than 100,000 centipoises at 25° C. of the formula:

$$(ROOCR')_a(R'')_b(R''')_c SiO_{\frac{4-(a+b+c)}{2}}$$

by the equilibration of an organopolysiloxane comprising about 80% to 99.9% by weight of an organosiloxane of the formula:

$$\left[ \begin{array}{c} R''' \\ | \\ SiO \\ | \\ R''' \end{array} \right]_a$$

the temperature employed, and the amount of catalyst utilized, etc. The resulting carbalkoxyalkylpolysiloxane polymers then can be recovered from the equilibration mixture in accordance with conventional procedures; in instances where an organic solvent has been employed, stripping, etc. may be utilized.

The polyvalent metal compounds utilized to cure the aforedescribed elastomeric forming copolymers, where the sum of $a$, $b$, and $c$ of Formula 1 is equal to 1.9 to 2.01, are preferably metal oxides such as red iron oxide, copper oxide, zinc oxide, etc., and mixtures thereof. Generally, a wide variety of polyvalent metal compounds can be used in the form of a polyvalent metal ion and an ion of a readily volatilizable substance. For example, polyvalent metal compounds can be employed of metals of group Ib, IIa, IIb, IIIa, IVa, IVb, Va, VIIb and VIII of the Periodic Table. Included are metal compounds of magnesium, strontium, barium, titanium, zirconium, manganese, cobalt, nickel, cadmium aluminum, tin, etc., such as the respective oxides, hydroxides, carbonates salt of carboxylic acids containing up to 11 carbon atoms, alcoholates of alcohols containing up to 11 carbon atoms, etc., thereof.

The organic peroxides that can be used with the elastomeric forming copolymers included by Formula 1 are for example, benzoyl peroxide, tertiary butyl perbenzoate, bis-(2,4-dichlorobenzoyl)peroxide, dicumyl peroxide, etc.

Polyols that can be employed to make the organopolysiloxane compositions convertible to the elastomeric state are polyhydric alcohols such as aliphatic dihydric alcohols, having from 2 to 10 carbon atoms, for example ethylene glycol, 1,3-propanediol, 1,2-butanediol, etc., aliphatic trihydric alcohols having from 3 to 12 carbon atoms, such as glycerol, 1,2,6-hexanetriol, etc.

Fillers that can be used in the organopolysiloxane compounds of the invention convertible to the elastomeric state, in combination with the polyvalent metal compounds, are known to the art as reinforcing and semireinforcing fillers. The reinforcing fillers, such as the silica fillers including fumed silica, precipitated silica and the like are structure-inducing and depending on the manufacture, may contain or be free of hydroxyl groups either in the form of adsorbed moisture or bonded to silicon atoms. These structure-inducing fillers may be modified such as, for example, by the introduction of silicon-bonded alkoxy groups in place of some hydroxyl groups. The preferred filler is a fumed silica filler. Examples of semireinforcing or non-structure forming fillers are titanium oxide, lithopone, calcium carbonate, and diatomaceous earth.

The organopolysiloxane compositions of the present invention can be made by incorporating into the elastomeric forming copolymer, the polyvalent metal compound, filler, glycol, peroxide catalyst, etc., while the copolymer is being milled or being subjected to shearing action such as produced by a dough mixer, blender and the like. The order of incorporation of the various ingredients into the copolymer is not critical, but it is preferred to add the filler first, followed by the polyvalent metal compound and other ingredients. The resulting organopolysiloxane composition can then be press-cured at 100° C. to 200° C. and postcured at temperatures up to 250° C. to the solid, elastomeric state.

In order that those skilled in the art will be better able to practice the invention, the following examples are given by way of illustration and not by way of limitation.

*Example 1*

A carbmethoxyethylmethyl hydrolyzate was made by adding 100 parts of cyanoethylmethyldichlorosilane to 200 parts of methanol. The mixture was heated at the reflux for about 4 hours, at the end of which time an excess of water was added. An oil was formed which was separated and washed with water several times.

To the above carbmethoxyethylmethyl hydrolyzate, there was added 0.1% by weight of potassium hydroxide, based on the weight of the hydrolyzate, and the mixture was heated under vacuum to 300° C. Tetracarbmethoxyethyltetramethylcyclotetrasiloxane was formed and was recovered from the mixture by distillation.

An equilibration mixture was formed by adding 25 parts of the equilibration catalyst utilized in the practice of the invention, to a mixture of 475 parts of octamethylcyclotetrasiloxane and 25 parts (5% by weight) of the above tetracarbmethoxyethyltetramethyltetrasiloxane.

The equilibration catalyst was formed by mixing equimolar amounts of phosphorous oxychloride and water and heating the mixture to 45° for a period of about 10 hours. The resulting mixture was heated for a period of 16 hours at 45° C. and post-heated at 150° C. for an additional 24 hours.

Other equilibration mixtures were formed by adding respectively to similar mixtures of octamethylcyclotetrasiloxane and tetracarbmethoxyethyltetramethyltetrasiloxane, 0.5 part of phenoxy phosphoryl chloride and 1 part of concentrated sulfuric acid. The mixtures were heated as above. Table I shows the results obtained with the equilibration catalyst of the present invention, "Bluestein," as compared to sulfuric acid and phenoxy phosphoryl chloride which is taught in Sprung Patent 2,472,629.

TABLE I

| Catalyst: | Product |
|---|---|
| Bluestein | Copolymer $10^5$ centipoises at 25° C. |
| $C_6H_5OPOCl_2$ | No reaction. |
| $H_2SO_4$ | Viscous two phase mixture. |

*Example 2*

An organopolysiloxane composition convertible to the cured, solid, elastic state was made by milling into 100 parts of the copolymer of Example 1, 40 parts of fumed silica treated in accordance with Lucas Patent 2,938,009, 0.9 part of zinc oxide, 1.7 parts of benzoyl peroxide. Prior to compounding, the copolymer had been oven treated by heating it for a period of 16 hours at 110° C. The resulting organopolysiloxane composition was then cured for 16 hours at 150° C. and post-cured for 16 hours at 250° C.

In addition to the above organopolysiloxane composition, other organopolysiloxane compositions were prepared, having respectively, per 100 parts of copolymer, 9 parts of zinc hydroxide and 1.8 parts of glycerol; and 7.2 parts of zinx oxide, 1.8 parts of glycerol and 0.4 part of benzoyl peroxide. Other organopolysiloxane compositions were also made which utilized magnesium oxide, red iron oxide and cupric oxide, respectively.

Table II shows the physical properties of the various cured organopolysiloxane compositions which were made from the elastomeric forming copolymer of Example 1 containing 5% by weight, based on the total weight of copolymer of chemically combined carbmethoxyethylmethylsiloxy units prepared in accordance with the practice of the present invention. In Table II, "H" (Shore A) is hardness, "T" (p.s.i.) is tensile, "E" (%) is elongation, and PVMC is polyvalent metal compound.

EXAMPLE 3

A copolymer was made in accordance with the procedure of Example 1 from a mixture of octamethylcyclotetrasiloxane and tetracarbmethoxyethyltetramethyltetrasiloxane which was present in the mixture at 1% by weight, based on the total weight of the mixture. The copolymer was oven treated for 72 hours at 150° C. An organopolysiloxane composition was made from the copolymer by milling it with 40 parts of fumed silica and 1.7 parts of benzoyl peroxide. Another organopolysiloxane composition was made from a copolymer by milling and from 0.1% to 20% by weight of a carbalkoxyalkyl-siloxane of the formula:

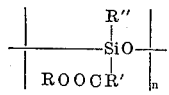

which process comprises (1) forming a mixture composed of by weight (A) 100 parts of said organopolysiloxane and (B) 0.1 to 1 part of an equilibration catalyst formed by reacting at a temperature in the range between $-10°$ C. to $100°$ C., equal molar amounts of water and phosphorous oxychloride, (2) heating said mixture of (1) to effect the equilibration of (A), where R is a member selected from the class consisting of monovalent hydrocarbon radicals, halogenated monovalent hydrocarbon radicals, and monovalent alkoxyalkyl radicals, R' is an alkylene radical, R'' is a member selected from the class consisting of monovalent hydrocarbon radicals and halogenated monovalent hydrocarbon radicals, R''' is a member selected from the class consisting of monovalent hydrocarbon radicals, halogenated monovalent hydrocarbon radicals and cyanoalkyl radicals, $a$ is equal to from .001 to 0.1, inclusive, $b$ is equal to from 0 to 0.2, inclusive, $c$ is equal to from 1.6 to 2.009, inclusive, and the sum of $a$, $b$, and $c$ is equal to from 1.9 to 2.01, inclusive, and $n$ is an integer equal to from 3 to 10, inclusive.

4. The method of claim 3 where the carbalkoxyalkyl-siloxane has the formula:

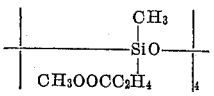

and the organosiloxane hydrolyzate has a formula:

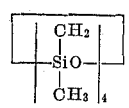

5. The method of claim 3 where the carbalkoxyalkyl-siloxane has the formula:

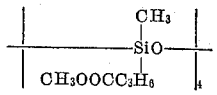

and the organosiloxane has the formula:

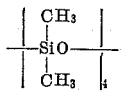

References Cited by the Examiner

UNITED STATES PATENTS

| | | |
|---|---|---|
| 2,371,068 | 3/1945 | Rochow. |
| 2,492,129 | 12/1949 | Sprung. |
| 2,723,987 | 11/1955 | Speier. |
| 2,900,363 | 8/1959 | Bluestein. |
| 2,957,899 | 10/1960 | Black et al. |
| 3,015,646 | 1/1962 | Speier. |
| 3,047,528 | 7/1962 | Bluestein. |

MORRIS LIEBMAN, *Primary Examiner.*

ALAN LIEBERMAN, *Examiner.*

J. W. BEHRINGER, J. H. DERRINGTON,
*Assistant Examiners.*